United States Patent [19]

Heitmann

[11] 4,216,057
[45] Aug. 5, 1980

[54] PURIFYING PLANT FOR WATER TO BE VAPORIZED IN A STEAM GENERATOR OF A NUCLEAR REACTOR

[75] Inventor: Hans-Günter Heitmann, Erlangen-Buckenhof, Fed. Rep. of Germany

[73] Assignee: Kraftwerk Union Aktiengesellschaft, Mülheim, Fed. Rep. of Germany

[21] Appl. No.: 857,702

[22] Filed: Dec. 5, 1977

[30] Foreign Application Priority Data

Dec. 10, 1976 [DE] Fed. Rep. of Germany ....... 2656096

[51] Int. Cl.² ............................................. G21D 1/02
[52] U.S. Cl. ....................................... 176/37; 176/65
[58] Field of Search ................... 176/37, 65; 210/222, 210/223; 60/646, 657

[56] References Cited

U.S. PATENT DOCUMENTS

| | | | |
|---|---|---|---|
| 3,539,509 | 11/1970 | Heitmann | 176/37 |
| 3,700,550 | 10/1972 | Shiells | 176/37 |
| 3,887,457 | 6/1975 | Marston | 210/222 |
| 3,894,391 | 7/1975 | Heitmann | 60/657 |
| 3,972,772 | 8/1976 | Heitmann | 176/37 |
| 4,024,911 | 5/1977 | Forrest et al. | 176/37 |
| 4,043,864 | 8/1977 | Heitmann | 176/37 |

*Primary Examiner*—Samuel W. Engle
*Assistant Examiner*—Edward F. Miles

*Attorney, Agent, or Firm*—Herbert L. Lerner

[57] ABSTRACT

A purification system for water to be vaporized in a steam generator of a nuclear reactor having a feedwater circulatory loop includes an electromagnetic filter having an inlet and an outlet connected in the feedwater circulatory loop, a line branching from the feedwater circulatory loop downstream of the electromagnetic filter in direction of feedwater flow therethrough, an ion exchange filter connected in the line, means for reducing pressure and temperature connected in the line upstream of the ion exchange filter in feedwater flow direction through the line, a shut-off valve connected in the feedwater circulatory loop upstream of the electromagnetic filter in the feedwater flow direction through the loop, and a connecting line extending from the feedwater tank to a location of the feedwater circulatory loop between the shut-off valve and the inlet of the electromagnetic filter. In another embodiment, instead of the connecting line, a circulatory pump is connected in the feedwater circulatory loop between the shut-off valve and the electromagnetic filter, the circulating pump having a pressure side connected to the electromagnetic filter and having a suction side connected to the shut-off valve, and a rinsing line extends from the pressure and temperature reducing means (a flash tank) and terminates in the feedwater circulatory loop between the suction side of the circulatory pump and the shut-off valve.

2 Claims, 1 Drawing Figure

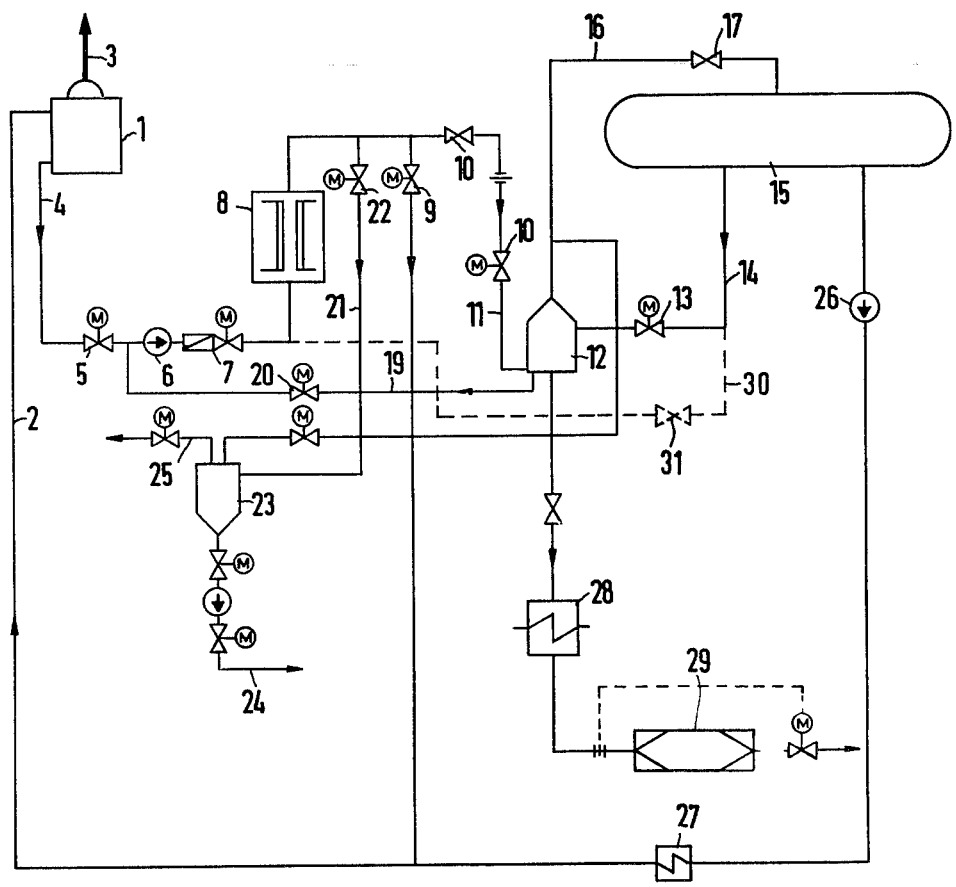

PURIFYING PLANT FOR WATER TO BE VAPORIZED IN A STEAM GENERATOR OF A NUCLEAR REACTOR

The invention relates to a purifying plant for water, hereinafter referred to as feedwater, that is to be vaporized in a steam generator of a nuclear reactor. An objective of such a purifying plant is to exclude iron oxide deposits as much as possible from the steam generating system. The iron content of the feedwater is in the order of magnitude of from 10 to 20 $\mu$g/Kg which means, for example, that 1000 to 2000 Kg of iron oxide are introduced per year into the steam generating system.

A filter plant for purifying primary water of pressurized water reactors has become known heretofore from German Published Prosecuted Application DAS No. 2 163 695 wherein there is disclosed an electromagnetic filter that is directly connected in parallel with a coolant pump so that the pump causes a particular flow of the water to run through the electromagnetic filter.

From the periodical "Nuclear Engineering International", December 1970, pages 989 to 991, it has become known, in this regard, to connect a magnetite filter ($Fe_3O_4$-filter) in series with a circulating pump to the feedwater circulatory loop and viewed in flow direction of the feedwater to branch a further partial flow from the loop behind or downstream of the magnetic filter, the further partial flow being conducted through a heat exchanger and a cooler to an ion exchange filter plant. In the latter, the ionized impurities of the feedwater can be removed. A device for rinsing the magnetite filter is not employable with this heretofore known plant, because the magnetite filter filled with $Fe_3O_4$ picks up additional magnetite from the feedwater and can, accordingly, be regenerated only by replacing the filter packing. If the water to be purified additionally contains radionuclides, for example, in boiling water reactors or in steam generator leakages in pressurized water reactors, large volumes of radioactive waste products accumulate.

It is an object of the invention of this application to provide a purification system or plant for water to be vaporized in a steam generator of a nuclear reactor wherein the continuous operation as well as the periodically required rinsing operation for purifying the filter bed can be effected with a minimum of additional plant components provided for the purification operation.

With the foregoing and other objects in view, there is provided, in accordance with the invention, in a purification system for water to be vaporized in a steam generator of a nuclear reactor having a feedwater circulatory loop, an electromagnetic filter having an inlet and an outlet connected in the feedwater circulatory loop, without any intermediate connection of an expander, a line branching from the feedwater circulatory loop downstream of the electromagnetic filter in direction of feedwater flow therethrough, an ion exchange filter connected in the line, means comprising a flash tank for reducing pressure and temperature connected in the line upstream of the ion exchange filter in feedwater flow direction through the line, a shut-off valve connected in the feedwater circulatory loop upstream of the electromagnetic filter in the feedwater flow direction through the loop, a circulating pump connected in the feedwater circulatory loop between the shut-off valve and the electromagnetic filter, the circulating pump having a pressure side connected to the electromagnetic filter and having a suction side connected to the shut-off valve, and a rinsing line extending from the flash tank and terminating in the feedwater circulatory loop between the suction side of the circulating pump and the shut-off valve.

In accordance with another feature of the invention, the flash tank is directly connected to the feedwater tank.

In accordance with an alternate embodiment of the invention, there is provided in a purification system for water to be vaporized in a steam generator of a nuclear reactor having a feedwater circulatory loop, an electromagnetic filter having an inlet and an outlet connected in the feedwater circulatory loop, without any intermediate connection of an expander, a line branching from the feedwater circulatory loop downstream of the electromagnetic filter in direction of feedwater flow therethrough, an ion exchange filter connected in the line, means for reducing pressure and temperature connected in the line upstream of the ion exchange filter in feedwater flow direction through the line, a shut-off valve connected in the feedwater circulatory loop upstream of the electromagnetic filter in the feedwater flow direction through the loop, and a connecting line extending from the feedwater tank to a location of the feedwater circulatory loop between the shut-off valve and the inlet of the electromagnetic filter.

Other features which are considered as characteristic for the invention are set forth in the appended claims.

Although the invention is illustrated and described herein as embodied in purifying plant for water to be vaporized in a steam generator of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a block circuit diagram of a purification system, according to the invention, for water to be purified in the steam generator of a nuclear reactor.

DETAILED DESCRIPTION OF THE DRAWING

Referring now to the drawing, there is shown therein a steam generator 1 of a light-water nuclear reactor to which feedwater is supplied through a line 2 and from which steam that is generated is delivered through a line 3 to a non-illustrated turbine. A line 4 for a partial flow wherein corrosion products are concentrated branches-off from the steam generator 1, and has connected therein a shut off valve 5, a circulating pump 6, additional check and shut-off valves 7, an electromagnetic filter 8 and a shut-off valve 9 before the line 4 again runs into or connects with the line 2 which supplied the feedwater to the steam generator 1.

Between the electromagnetic filter 8 and the shut-off valve 9, which is connected behind or downstream of the electromagnetic filter 8 from the steam generator 1, a line 11 with additional valves 10 connected therein extends to a flash tank 12 of the type shown and described, for example in U.S. Pat. No. 3,700,550 to D.

Shiells. The flash tank 12 is connected through a valve 13 and a line 14 to a feedwater tank 15 and is also connected thereto through a steam line 16 and a valve 17. A rinsing line 19 with a valve 20 connected therein extends from the flash tank 12 to the suction side of the circulating pump 6, the rinsing line 19 terminating in the line 4 between the shut-off valve 5 and the circulating pump 6. Another rinsing line 21 branches from the line 11 directly behind or downstream from the electromagnetic filter 8 in the flow direction of the feedwater therethrough. A valve 22 is connected in the rinsing line 21. The rinsing line 21 terminates in a rinsing water expansion tank 23 from which a waste-water line 24 and a steam line 25 extend. Also forming part of the nuclear reactor plant per se are a feedwater pump 26 and a preheater 27, both connected in the feedwater line 2, and a cooler 28 and an ion exchange filter 29, both connected in another line extending from the flash tank 12. With the purifying plant according to the invention, the electromagnetic filter is thus able to be employed for rinsing, using the feedwater supply in the feedwater tank 15 or in an otherwise provided flash tank 12 together with the circulating pump 6. Only a rinsing-water expansion tank has to be provided, in addition, for purification of the magnetic filter.

As further shown in a broken line in the FIGURE, a direct connecting line 30 is provided between the feedwater tank 15 and the inlet to the electromagnetic filter 8. The electromagnetic filter 8 can be rinsed through this connecting line 30 without any intermediate connection of a rinsing pump.

There is claimed:

1. In a purification system for water to be vaporized in a steam generator of a nuclear reactor having a feedwater circulatory loop, a feedwater tank connected in the feedwater circulatory loop, an electromagnetic filter having an inlet and an outlet directly connected to the feedwater circulatory loop, a first and second line branching from the feedwater circulatory loop downstream of said electromagnetic filter in direction of feedwater flow therethrough, said first line being a rinsing line, rinse water pressure and temperature reducing means connected to said first rinsing line, and a waste water line connected to said rinse water reducing means, an ion exchange filter connected in said second line, means comprising a flash tank for reducing pressure and temperature connected in said second line upstream of said ion exchange filter in feedwater flow direction through said second line, a shut-off valve connected in said feedwater circulatory loop upstream of said electromagnetic filter in said feedwater flow direction through said loop, a circulating pump connected in said feedwater circulatory loop between said shut-off valve and said electromagnetic filter, said circulating pump having a pressure side connected to said electromagnetic filter and having a suction side connected to said shut-off valve, and a third line being a rinsing line extending from said flash tank and terminating in said feedwater circulatory loop between said suction side of said circulating pump and said shut-off valve, whereby during emergency operation of the reactor the electromagnetic filter may be periodically rinsed.

2. In a purification system for water to be vaporized in a steam generator of a nuclear reactor having a feedwater circulatory loop, a feedwater tank connected in the feedwater circulatory loop, an electromagnetic filter having an inlet and an outlet directly connected to the feedwater circulatory loop, a first and a second line branching from the feedwater circulatory loop downstream of said electromagnetic filter in direction of feedwater flow therethrough, said first line being a rinsing line, rinse water pressure and temperature reducing means connected to said first rinsing line, and a waste water line connected to said rinse water reducing means, an ion exchange filter connected in said second line, means for reducing pressure and temperature connected in said second line upstream of said ion exchange filter in feedwater flow direction through said line, a circulating pump connected in said feedwater circulatory loop upstream of said electromagnetic filter in said feedwater flow direction through said loop, and third line being a connecting line extending from said feedwater tank to a location of said feedwater circulatory loop between said circulating pump and said inlet of said electromagnetic filter, whereby during emergency operation of the reactor the electromagnetic filter may be periodically rinsed.

* * * * *